Nov. 28, 1933. G. TRAUTVETTER 1,937,301
ARMREST
Filed April 28, 1932
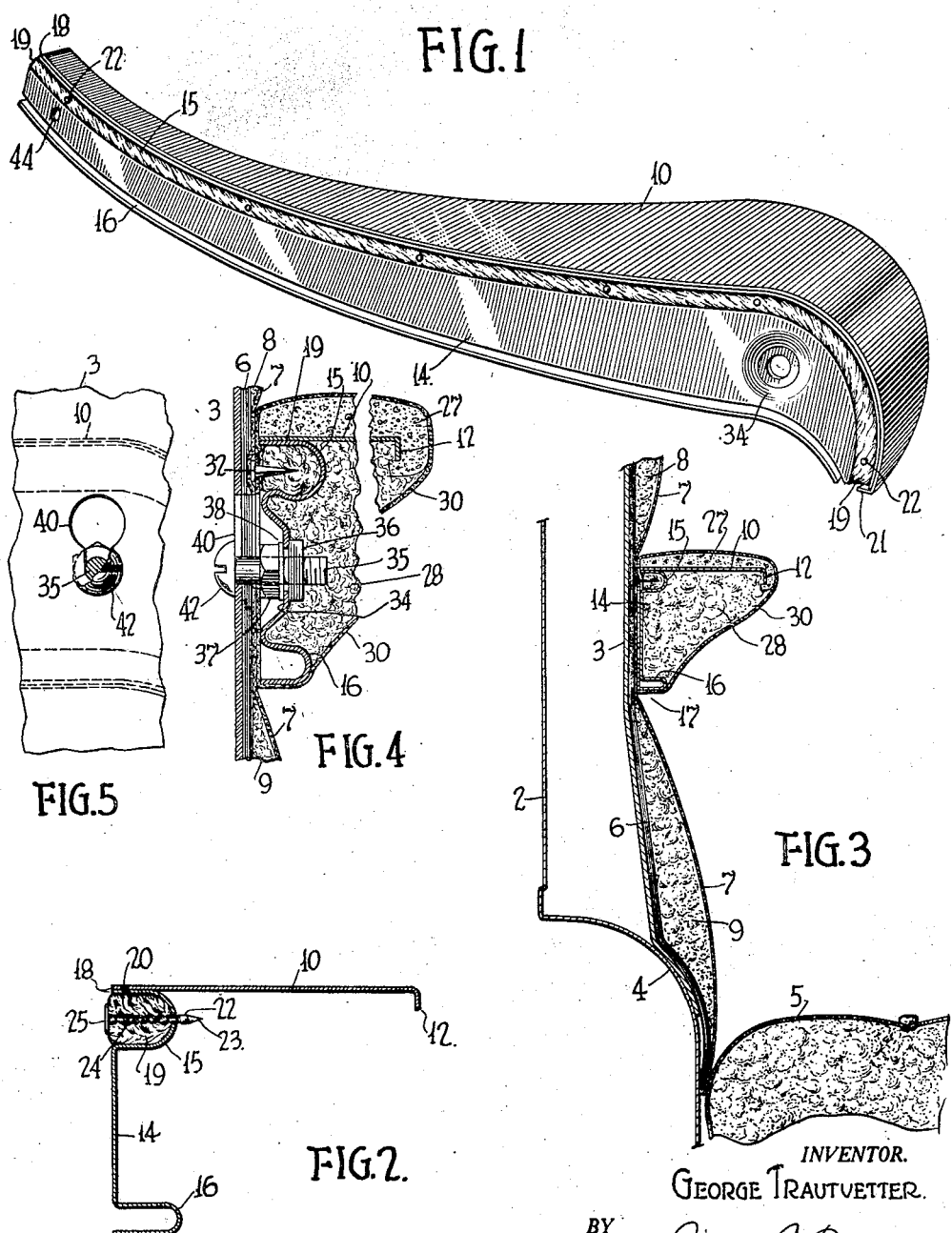
INVENTOR.
GEORGE TRAUTVETTER.
BY
ATTORNEY.

Patented Nov. 28, 1933

1,937,301

UNITED STATES PATENT OFFICE 1,937,301

ARMREST

George Trautvetter, Philadelphia, Pa., assignor to Edward G. Budd Manufacturing Company, Philadelphia, Pa., a corporation of Pennsylvania Application April 28, 1932. Serial No. 607,904

5 Claims. (Cl. 155—198)

My invention relates to arm rests and particularly to side-wall arm-rest structures for transportation vehicles, such as automobiles, aeroplanes and the like.

The objects of my invention include facilitating the fabrication, assembly and spot-welding to each other of the parts of a sheet-metal arm-rest superstructure, rendering more convenient the mounting of the upholstery on the superstructure, and mounting the completed unit in a vehicle, simulating, with simple sheet-metal elements, the form of contoured wood or wood-supported arm-rests, providing improved cushioning effects, reducing weight and cost, simplifying and rendering the device more durable in construction, reducing the cost of manufacture, rendering the structure more effective in operation and attaining other advantages incident to the utilization of the improvement.

Heretofore, arm-rests for automobiles have been constructed of padding and cover materials on a superstructure of wood that has, in general, conformed to the contours of the rests, or the rests have been constructed entirely of wood of carved or other ornate shape.

In such structures, the wood parts are difficult to fabricate, are subject to splitting in manufacture and in service, and have other disadvantages, such as deterioration from moisture and destruction by fire, both before and after the installation thereof.

In practicing my invention, I provide an arm-rest in which the supported superstructure is constructed entirely of relatively thin-gauge stainless sheet steel, to facilitate spot welding, to provide yieldability where cushioning effect is desired and to provide rigid bracing where such bracing is desired.

The device is, in these features alone, therefore subject to a greater versatility of uses than were it constructed of wood.

Elongated sheet-metal straps are arranged to provide a major section of substantially L-shape to provide side support and a yieldable cantilever top, but are also, provided with narrow flanges at right angles to the ends of the L to render the structure, from another consideration, of substantially dove-tail section, as will hereinafter be pointed out.

The side wall is provided with a recess or groove that has the double function of supporting an upholstery-anchorage member or strip and transversely bracing the top-wall, and other features of advantage are provided, as will be disclosed.

Fig. 1, of the accompanying drawing, is a perspective view of an arm-rest embodying my invention, as viewed from the outside of an automobile with a portion of the side wall of the latter removed, Fig. 2 is a transverse section of the structure of Fig. 1, as viewed from the right toward the left, Fig. 3 is a transverse section of a portion of an automoble, as viewed from the left rear, through the wheel-housing, and through the rear seat and other parts, including a section of the arm-rest, as shown in Fig. 2, Fig. 4 is an enlarged detail section, viewed in the direction of Fig. 3, but at a slghtly different cross section thereof near the front or right end of the arm rest as viewed in Fig. 1, and Fig. 5 is a view of the structure of Fig. 4, taken at right angles thereto.

Referring to Fig. 3, the device is shown applied to a body wall comprising an outer side panel 2, an inner side panel 3, a wheel housing 4, a rear seat 5, a lining 6, on the inside surface of the inner panel 3, and an upholstery cover 7, covering, and extending between, bodies 8 and 9 of upholstery padding above and below the arm rest of my invention, respectively.

Referring to Figs. 1 and 2, the device comprises a top wall 10 of thin gauge sheet-steel contoured to divergingly taper from rear to front and curving upwardly at the rear and downwardly at the front. It also has a narrow depending flange 12 at its outer edge to strengthen it and give it garnish.

A side wall 14, also of thin-gauge sheet-steel similarly divergingly tapers from rear to front and curves upwardly at the rear and downwardly at the front. Upper and lower channel sections 15 and 16, respectively, are provided along the edges of the wall 14, to provide high resistance to lateral bending, to provide a receptacle for a tacking strip of twisted paper cordage 19, to space the upholstery from the cover 7, as indicated at a position 17 in Fig. 3, and to provide transverse bracing for the top wall 10.

The top wall is disposed in side-surface engagement with the top side of the channel section 15, in edge-to-edge relation thereto, as indicated at position 18, and spot-welded thereto, as indicated at joint 20, and also, has an inturned transverse flange 21 at its lower front end.

The twisted-paper cordage 19 is jammed or wedged into the channel of the section 15, to constitute a yieldable anchorage for upholstery tacks, and is held in position, as by nails 22. Each nail 22 has a sharp hardened point 23, a high-pitch screw section 24 and a flat head 25, whereby it may, by a driving or longitudinal thrust movement turn its way through the twisted paper, penetrate the steel at the bottom of the channel, lock itself to the paper and to the steel, and have its head substantially flush with the inner surface of the wall.

A pad 27, over the top wall 10, and its flange 12, and a body of felt 28, in the substantially dove-tail groove provided by the parts 10, 12, 14 and 16, are held in position by the walls of the groove and by an upholstery cover 30 that is wrapped about the other parts, with its edges overlapping each other opposite the open side of the channel section 15 next to the wall 3, where it is secured upon itself and to the anchorage 19 by suitable upholstery tacks 32 or other means.

The arm 10 being transversely supported only adjacent to its inner edge, and constituting, in effect, a relatively long cantilever beam, provides yieldability, in addition to that of the upholstery. The flange 12 functions as a garnish edge, of reduced sharpness and as a reinforcement for the wall 10.

The side wall 14, adjacent to its forward end, is provided with an annular offset or cup portion 34 having an aperture therethrough for the reception of a stove bolt 35 which is locked in position by nuts 36 and 37 and a lock washer 38; the cup 34 being adapted to provide a space for the nut 37 and the lock washer 38 between the cover 7 and the wall 14.

The panel 3 is provided with a recess 40 of two diameters corresponding to, but slightly greater than, the diameters of the bolt 35 and its screw head 42.

The bolt is adjusted longitudinally, in accordance with the total thickness of the parts 3, 6 and 7 between the inner surface of the bolt head 42 and the wall 14; the parts 6 and 7 being also, apertured to permit the bolt to extend therethrough.

In mounting the arm rest, it is placed with the bolt head 42 opposite the large-diametered portion of the opening 40 and pressed against the upholstery cover 7 normal to the plane of the panel 3 until the head 42 passes through the opening 40. The rest is then moved downwardly, parallel to the panel 3, until the bolt shank 35 fits the smaller diametered portion of the opening 40. The head 42 is thus locked against the panel 3 and the arm rest held in position.

A similar attaching device may be provided at the rear end of the wall 14 but, since this end of the rest is of small thickness normal to the panel 3 and disposed between the upholstery of the back rest of the seat 5, it may be secured by a simple screw extending through the cover 30, the felt 28 and an opening 44 in the panel 3.

In the above-described structure, the arm rest not only serves to hold and to shape the upholstery on the panel 7 but is provided with a quick detachable mounting means of the plug-and-socket or bayonet-joint type whereby it may easily be mounted and detached.

While I have shown and described a particular form of my invention, changes may be effected therein without departing from the spirit and scope thereof, as set forth in the appended claims.

I claim as my invention:

1. A sheet-metal arm-rest comprising a rear wall portion for disposition against an inside surface of a vehicle and having an upper longitudinal side-edge channel section open toward said surface, and a top wall transversely supported by said section.

2. A sheet-metal arm-rest comprising a rear wall portion for disposition against an inside surface of a vehicle and having upper and lower longitudinal side-edge channel sections open toward said vehicle wall, and a top wall transversely supported by said upper channel section and having a downwardly-projecting outer-edge flange.

3. An arm-rest comprising a sheet-metal rear-wall stamping for disposition against an inside surface of a vehicle and having upper and lower longitudinal side-edge channel sections open toward said surface, and a sheet-metal top wall in side-surface engagement with, and spot-welded to, the top side of the upper channel section in edge-to-edge relation thereto and having a downwardly-projecting outer edge flange.

4. A sheet metal arm rest comprising a transversely extending top wall, a rear wall portion for disposition against an inside surface of the vehicle and having an upper longitudinal side edge channel section open toward said surface, and a flexible upholstery tacking strip seated and secured in said channel.

5. An arm rest comprising a sheet metal frame having a transversely extending top wall and a rear wall portion for disposition against an inside surface of the vehicle and having an upper longitudinal side edge channel section opening toward said surface, a flexible upholstery tacking strip seated and secured in said channel, upholstery filling material surrounding the outside and top of said sheet metal frame, and a fabric cover for said filling and frame having its longitudinal edges overlapped in the region of said tacking strip and secured thereto.

GEORGE TRAUTVETTER.